DOUBLE PULSE GAS TUBE MODULATOR
Filed March 5, 1951
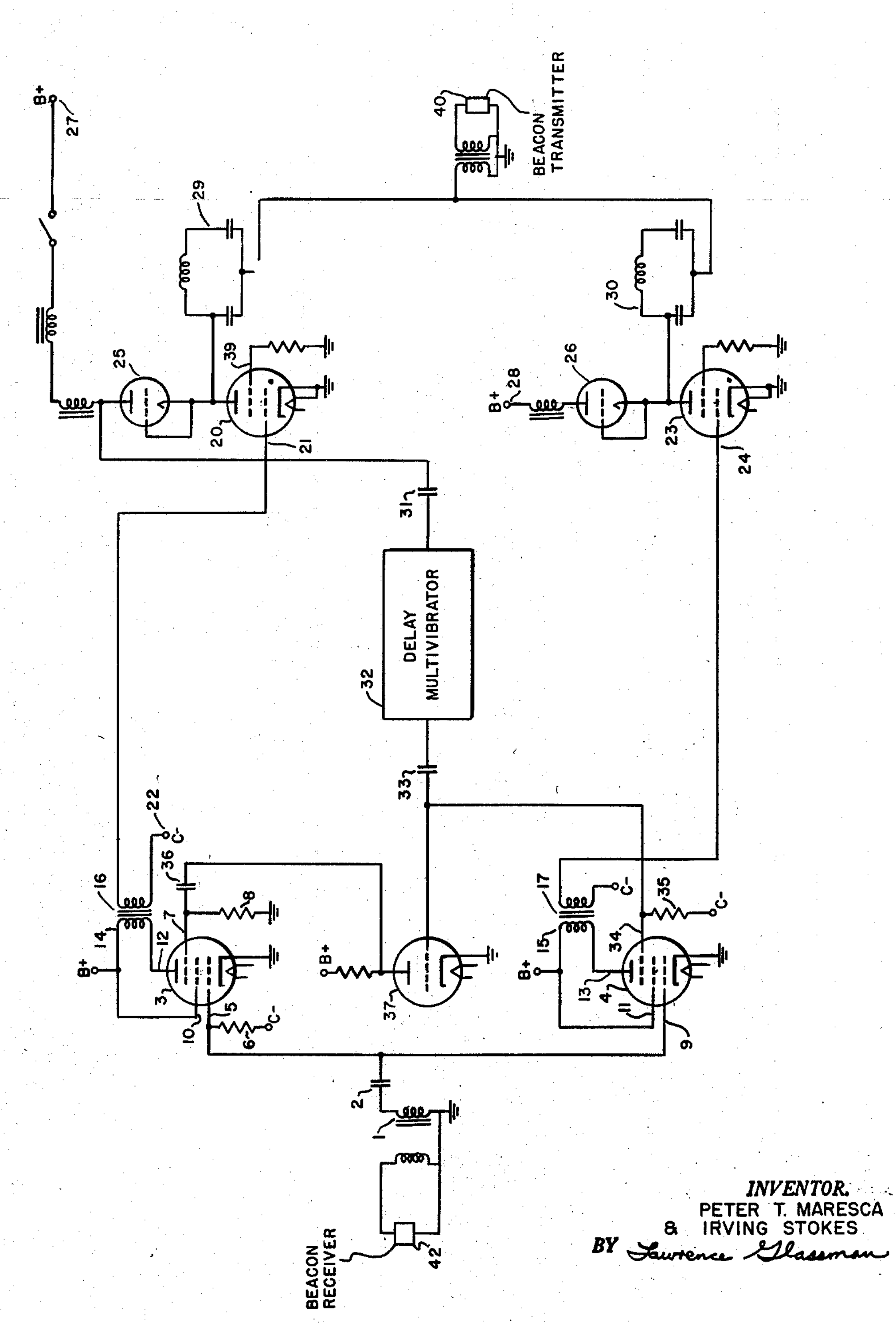
INVENTOR.
PETER T. MARESCA
& IRVING STOKES
BY Lawrence Glassman Patented June 30, 1953 2,644,157

UNITED STATES PATENT OFFICE 2,644,157

DOUBLE PULSE GAS TUBE MODULATOR

Peter T. Maresca, Asbury Park, and Irving Stokes, Red Bank, N. J., assignors to the United States of America as represented by the Secretary of the Army Application March 5, 1951, Serial No. 213,996

16 Claims. (Cl. 343—101)

(Granted under Title 35, U. S. Code (1952), sec. 266)

The invention described herein may be manufactured and used by and for the Government for governmental purposes without the payment to us of any royalty thereon.

This invention relates to gas tube modulator circuits, particularly the application of such circuits to provide for the keying of a beacon transmitter by unsynchronized or random pulses.

The invention comprises two amplifiers connected in parallel for amplifying pulses received from the blocking oscillator of a beacon receiver. One of these amplifiers is normally "on," that is, its control grid has a fixed bias which is overcome by the first incoming pulse applied to the control grids from the blocking oscillator. The other amplifier is normally "off," that is, its suppressor grid has a fixed bias, as well as its control grid so that the first incoming pulse applied to its control grid does not affect the operation of this second amplifier. The first pulse is then amplified, inverted and applied to the grid of a gas tube modulator having a pulse forming network in its plate circuit, through which a trigger pulse is applied to a beacon transmitter. At the same time a pulse from the gas tube circuit triggers a delay multivibrator which produces a switching wave which blocks the first amplifier and removes the bias on the suppressor grid of the second amplifier, thus readying the second amplifier for the second pulse from the blocking oscillator and disabling the first amplifier. The second amplifier has associated therewith another gas tube modulator also triggering the beacon transmitter.

An object of this invention is to provide a novel pulse keying circuit for triggering a beacon transmitter.

A further object of this invention is to provide a circuit which makes possible the triggering of a gas tube modulator by two independent, unsynchronized pulse sources, with the modulator answering unimpaired to both.

For a better understanding of the invention, together with other and further objects thereof, reference is made to the following description, taken in connection with the accompanying drawing in which is shown the circuit diagram of a pulse keying circuit incorporating the invention.

Referring to the drawing, there is provided a pulse through transformer 1, from the blocking oscillator of a beacon receiver 42, which is coupled by means of condenser 2 to the control grids 5 and 9 of amplifiers 3 and 4; control grids 5 and 9 of tubes 3 and 4 are kept at a fixed negative bias through resistor 6 connected to a negative source of potential, while suppressor grid 7 is returned to ground through resistor 8. The suppressor grid 34 of amplifying tube 4 is also kept at a fixed negative bias through resistor 35 connected to a source of negative potential. Screen grids 10 and 11 are tied to anodes 12 and 13 through the primaries 14 and 15 of pulse transformers 16 and 17. These primaries are in the anode circuits of tubes 3 and 4, respectively. The output of tube 3 is taken from its anode circuit through pulse transformer 16. The secondary winding of transformer 16 is directly connected to the control grid 21 of gas tube 20 and to negative voltage source 22, which grid is kept at a fixed negative bias by voltage source 22. The anode circuit of amplifying tube 4 is similarly connected through pulse transformer 17 to the control grid 24 of gas tube 23. Gas tubes 20, 23 are connnected through charging diodes 25, 26 to the sources of energizing potentials 27, 28. The output circuits of gas tubes 20, 23 are connected to the primary winding of a transformer having its secondary connected to a beacon transmitter 40 through pulse forming networks 29 and 30. The operation of such a gas tube modulator is well known and is described in the Radiation Laboratory Series, vol. 5, published by the McGraw-Hill Publishing Company, 1948.

The output of gas tube 20 is used to trigger beacon transmitter 40 and is also taken off through capacitor 31 and used to trigger delay multivibrator 32. The output of multivibrator 32, which multivibrator is of the single shot type, is then applied through capacitor 33 directly to suppressor grid 34, then inverted by tube 37 and then applied to suppressor grid 7 of tube 3 through capacitor 36.

The mode of operation of the above described circuit is believed to be essentially as follows:

Positive signals from the beacon blocking oscillator are differentiated by coupling transformer 1 (as described on page 73 of volume 21 of the Radiation Laboratory Series, 1948) and passed on to the control grids 5 and 9 of tubes 3 and 4 through coupling capacitor 2. Amplifying tube 3 has its suppressor grid 7 returned to ground and consequently reproduces the incoming signal in the plate circuit of tube 3, since the incoming signal is of positive polarity and exceeds the fixed bias on control grid 5. The reproduced pulse in the plate circuit of tube 3 is much wider than the incoming signal and of negative polarity. The negative pulse is inverted by pulse transformer 16 and, when applied to grid 21, triggers gas tube modulator 20. The plate circuit of gas tube 20 includes a pulse forming network 29 connected to beacon transmitter 40 and charged through diode 25 by direct current source 27. The firing of gas tube 20 by the broadened pulse derived from transformer 16 causes pulse forming network 29 to be discharged through gas tube 20 and the primary winding of the transformer that couples beacon transformer 40 to pulse forming network 29. The pulse produced by the discharge of pulse forming network 29 is used to trigger beacon transmitter 40. Since amplifying tube 4 is operated at both control grid and suppressor grid cutoff, tube 4 is unaffected by the first incoming pulse. Upon the discharge of pulse forming network 29 by the firing of gas tube 20 associated with amplifier tube 3, delay multivibrator 32 produces a switching wave of duration equal to the charging time of the the plate circuit of gas tube 20. This positive switching wave is applied to suppressor grid 34 of tube 4, thereby readying tube 4 to deliver a second pulse to the associated gas tube modulator 23. Simultaneously, a negative wave, formed by the inversion of the positive switching wave produced by multivibrator 32 and of the same duration, is applied to the suppressor grid 7 of tube 3 through tube 37, to prevent gas tube modulator 20 from being triggered again by this second pulse before its plate circuit has attained a fully charged status.

Assume now that a second pulse is impressed on control grids 5 and 9 from coupling transformer 1. If this second pulse arrives during a time when the plate circuit of gas tube modulator 20 is being discharged or has not been fully recharged, vacuum tube 3 cannot be triggered since it was rendered inoperative by the negative switching wave produced by multivibrator 32 and inverter tube 37. However, tube 4, simultaneously having been unblocked by the positive switching wave produced by multivibrator 32 and applied to its suppressor grid 34 by capacitor 33, will amplify this second pulse and initiate the triggering of beacon transmitter 40 in a manner similar to the operation of tube 3 and its associated circuits, as described above. If this second pulse arrives after the recharging of the plate circuit of gas tube 20 has been completed, the condition of vacuum tubes 3 and 4 will again be that described at the time of the first incoming pulse. Thus it has been shown that beacon transmitter 40 will be triggered into operation by any series of random or unsynchronized pulses received by a beacon receiver associated with coupling transformer 1, either through the circuit path of tube 3, pulse transformer 16 and modulator 20, or the circuit path of tube 4, pulse transformer 17 and modulator 23.

While it might be attempted to use the output of a delay multivibrator directly to operate a low impedance device, such as suppressor grid 39 of gas tube 20, it has been found that such a device cannot stand much loading, and any such attempt results in the disabling of the multivibrator. It has been found possible however to key "on" suppressor grid 34 of amplifier tube 4. Furthermore a negative output of fairly high amplitude, required to key "off" suppressor grid 7 of amplifier tube 3 can be derived from delay multivibrator 32 merely by inversion of the positive wave through vacuum tube 37. It has also been found that the inputs of gas tubes 20 and 23 cannot be paralleled and are best isolated by means of vacuum tube drivers such as tubes 3 and 4.

Another advantage accruing from the use of keyed amplifier tubes 3 and 4 is that they provide trigger pulses of at least 5 microseconds duration, the minimum duration required by thyratrons 20 and 23. Sharp pulses presented to tubes 3 and 4 by the blocking oscillator coupled to transformer 1 are reproduced by pulse transformers 16 and 17 as wide pulses satisfactory for thyratron triggers. Since there is a delay through tubes 3, 20, 32 and 37 of the initiation of the switching wave, and this delay is made greater than the pulse width of the incoming pulse, this means that the first pulse or any one pulse arriving at tubes 3 and 4 will not fire both thyratrons 20 and 23. If this were not the case, a delay would be necessary in the input to multivibrator 32, to insure that the normally "off" amplifier tube 4 is not keyed on until the first pulse no longer appears at the common input to tubes 3 and 4. Since tubes 3 and 4 are operated at control grid cutoff, the application of a switching wave to suppressor grids 7 and 34 does not result in the generation of troublesome plate current pedestals.

It is important that delay multivibrator 32 be triggered only by the discharge of modulator 20 and not by modulator 23. This is made possible by the use of coupling condenser 31 taking the signal off the plate side of charging diode 25 rather than the plate side of tube 20.

What is claimed is:

1. A pulse keying circuit comprising first and second vacuum tubes, each of said vacuum tubes having a control grid, a suppressor grid and an anode circuit, said control grids being kept at a fixed negative bias sufficient to render said tubes cut off, the suppressor grid of said first tube being connected to ground, the suppressor grid of said second tube being kept at a fixed negative bias sufficient to render said second tube cut off regardless of the bias on its control grid, means for applying first and second pulses to said control grids whereby said first tube is rendered conductive by the first applied pulse but said second tube remains cut off, first and second gas discharge tubes each respectively having a control grid, first and second pulse transformers, the control grid of said first gas discharge tube being connected to the anode circuit of said first vacuum tube through said first pulse transformer whereby said first gas discharge tube is fired by said first pulse, means for generating a switching wave, means for applying the output pulse of said first gas tube to said generating means to initate said switching wave, and means for applying said switching wave to the suppressor grids of said vacuum tubes to render said first vacuum tube inoperative but to counteract the negative bias on the suppressor grid of said second vacuum tube, the control grid of said second gas discharge tube being connected to the anode circuit of said second vacuum tube through the second of said pulse transformers whereby said second gas discharge tube may be fired by the second pulse coupled to the control grids of said vacuum tubes by said pulse applying means during the duration of said switching wave.

2. A pulse keying circuit comprising first and second vacuum tubes each respectively having a control grid, a suppressor grid, and an output circuit, means connected to both said control grids for impressing first and second pulses thereon, means for applying a negative bias to both said control grids, means for normally maintaining a negative bias on said suppressor grid of said second tube whereby only said first vacuum tube is rendered operative by said first pulse, first and second gas discharge tubes, means connected to the output circuit of said first vacuum tube for firing said first gas tube in response to said first pulse, a multivibrator, coupling means for triggering said multivibrator by the output of said first gas tube whereby a switching wave is produced by said multivibrator, means for impressing said switching wave on said suppressor grids to render said first vacuum tube inoperative and to overcome said negative bias upon the suppressor grid of said second vacuum tube, and means connected to the output circuit of said second vacuum tube for firing said second gas tube, whereby said second gas tube may be fired in response to said second pulse occurring during the duration of said switching wave.

3. A pulse keying circuit comprising first and second alternately operative vacuum tubes each having a control grid, a suppressor grid, and an anode circuit, a common fixed negative bias connected to said control grids, a common connection for impressing first and second pulses on said control grids, means for normally maintaining a bias on the suppressor grid of said second vacuum tube whereby only said first vacuum tube is rendered operative by said first pulse, a first gas discharge tube connected to the anode circuit of said first vacuum tube whereby said first gas discharge tube is fired by the output pulse of the anode circuit of said first vacuum tube, means connected to the output of said first gas discharge tube for initiating a switching wave in response to the firing thereof, means for impressing said switching wave on both said suppressor grids to render said first vacuum tube inoperative and to overcome the bias upon the suppressor grid of said second vacuum tube, and a second gas discharge tube connected to the anode circuit of said second vacuum tube, whereby said second gas discharge tube is fired by the second of said pulses occurring during the duration of said switching wave.

4. A pulse keying circuit comprising first and second alternately operative paths both receptive of first and second pulses, said paths each respectively comprising a vacuum tube amplifier, a pulse transformer, and a gas discharge tube, said pulse transformer being connected between the output of its respective vacuum tube amplifier and the input of its respective gas discharge tube, a multivibrator connected to the output of the gas discharge tube in said first path for generating a switching wave in response to the operation of said first path due to said first pulse, and means for applying said switching wave to the vacuum tubes in said first and second paths to cause said first path to be inoperative and said second path to be operated by said second pulse occurring during the duration of said switching wave.

5. In combination, a beacon receiver, a beacon transmitter, and a circuit for keying said transmitter by first and second pulses received by said receiver, said circuit comprising first and second alternately operative paths, said paths each respectively comprising a vacuum tube amplifier coupled to and firing a gas discharge tube, the gas tubes of both said paths being connected to said transmitter, and a multivibrator connected between the output of one of the gas tubes in one of said paths and the vacuum tubes of both said paths so that said vacuum tubes are alternately blocked and unblocked by a switching wave produced by said multivibrator, the alternate firing of said gas tubes by said first and second pulses serving to key said transmitter in response to said pulses.

6. The circuit of claim 1, further including first and second pulse forming networks, means for charging said networks, said first pulse forming network being connected across said first gas tube and also connected to transmitting means, said first pulse forming network being connected across said second gas tube and also connected to said transmitting means, whereby the firing of said gas tubes by said first and second pulses will cause said pulse forming networks to be discharged and pulse said transmitting means.

7. The circuit of claim 6, wherein the generation of said switching wave is delayed by a time interval at least equal to the duration of said first input pulse.

8. The circuit of claim 7, wherein said switching wave has a time duration substantially equal to the time required by said first pulse forming network to be fully charged by said charging means.

9. The circuit of claim 8, wherein said switching wave generating means generates a positive switching wave that is applied to the suppressor grid of said second vacuum tube, and means for inverting the output of said generating means for applying a negative switching wave to the suppressor grid of said first vacuum tube.

10. The circuit of claim 9, wherein said generating means comprises a multivibrator.

11. The circuit of claim 10, further including a diode connected to the anode of said first gas tube and between said first pulse forming network and said charging means, the output of said diode being coupled to said means for generating a switching wave.

12. A pulse keying circuit comprising, first normally inoperative switch means receptive of at least first an second input pulses for producing a first triggering pulse in response to said first input pulse, second normally inoperative switch means also receptive of both said input pulses, and pulse producing means receptive of and responsive to said first triggering pulse for producing an output pulse delayed at least for the duration of said first input pulse, said output pulse being coupled to said first and second switch means to ensure that said first switch means does not respond to said second input pulse during the duration of said output pulse and to cause said second switch means to become responsive to said second input pulse appearing during the duration of said output pulse and to thereby enable said second switch means to produce a second triggering pulse.

13. The circuit of claim 12, wherein said pulse producing means includes means adapted to be charged, the duration of said output pulse being sufficient to enable said last named means to become fully charged.

14. The circuit of claim 12, wherein said output pulse from said pulse producing means is applied directly to said second switch means, and means for inverting said output pulse and applying the inverted pulse to said first switch means.

15. The circuit of claim 12, wherein said first and second switch means respectively comprise first and second vacuum tubes each respectively having first and second control grids therein, said first and second input pulses being applied to both said first grids of said tubes, and said output pulse being coupled to said second grids of said tubes.

16. The circuit of claim 15, wherein said output pulse from said pulse producing means is applied directly to said second grid of said second vacuum tube, and means for inverting said output pulse and applying the inverted pulse to said second grid of said first vacuum tube.

PETER T. MARESCA.
IRVING STOKES.

References Cited in the file of this patent

UNITED STATES PATENTS

| Number | Name | Date |
|---|---|---|
| 2,530,096 | Sudman | Nov. 14, 1950 |
| 2,545,464 | Hoeppner et al. | Mar. 20, 1951 |
| 2,558,373 | O'Day | June 26, 1951 |
| 2,561,772 | Atwood | July 24, 1951 |